United States Patent [19]
Kohyama

[11] Patent Number: 4,841,335
[45] Date of Patent: Jun. 20, 1989

[54] RECORDING APPARATUS AND METHOD

[75] Inventor: Mitsuaki Kohyama, Tokyo, Japan

[73] Assignee: Kabushiki Kaisha Toshiba, Kawasaki, Japan

[21] Appl. No.: 937,977

[22] Filed: Dec. 4, 1986

[30] Foreign Application Priority Data

Dec. 5, 1985 [JP] Japan .................. 60-272482

[51] Int. Cl.$^4$ ............................................. G03G 15/01
[52] U.S. Cl. .................................... 355/245; 355/326; 430/42; 430/45
[58] Field of Search ........... 355/3 R, 4, 3 DD, 3 CH, 355/14 CH, 14 D; 430/42, 45

[56] References Cited

U.S. PATENT DOCUMENTS 4,165,165  8/1979  Iwami .................................... 355/4
4,599,285  7/1986  Haneda et al. .................... 355/4 X

FOREIGN PATENT DOCUMENTS 2434428  2/1975  Fed. Rep. of Germany.
3531086  3/1986  Fed. Rep. of Germany.
3530733  5/1986  Fed. Rep. of Germany.
59-121349 7/1984 Japan.

*Primary Examiner*—Patrick R. Salce
*Assistant Examiner*—Emanuel Todd Voeltz
*Attorney, Agent, or Firm*—Cushman, Darby & Cushman

[57]  ABSTRACT

A recording apparatus having an operation panel for selecting a first mode for recording a color image or a second mode for recording a monochromatic image, and for selecting a color for the monochromatic image-recording. When the first mode is selected, a charger electrically charges a photosensitive drum. A latent image is formed and developed on the drum by an image-forming/developing unit, thereby forming a color toner image. A bias electric field is applied between the drum and a developing roller, whereby the toner from the roller is attracted to the drum and does not return to the roller. The latent image can thus be developed without contacting the drum or the coller. The color toner image is transferred to a transfer sheet by a transfer charger. When the second mode is selected, the charger electrically charges the drum. A latent image is formed and developed on the drum by image-forming/developing unit, thus forming a monochromatic image. An A.C. electric field is applied between the drum and the roller. This electric field has an intensity great enough to, and a frequency high enough to cause the toner flown from the roller to move back and forth. The monochromatic image is transferred to a transfer sheet.

16 Claims, 6 Drawing Sheets

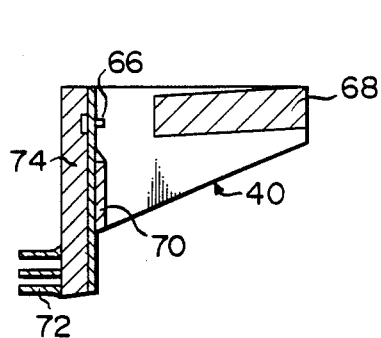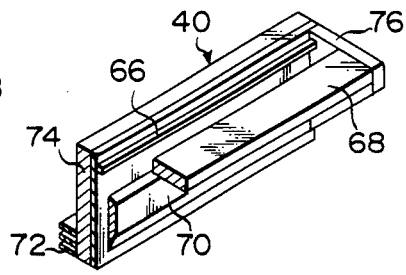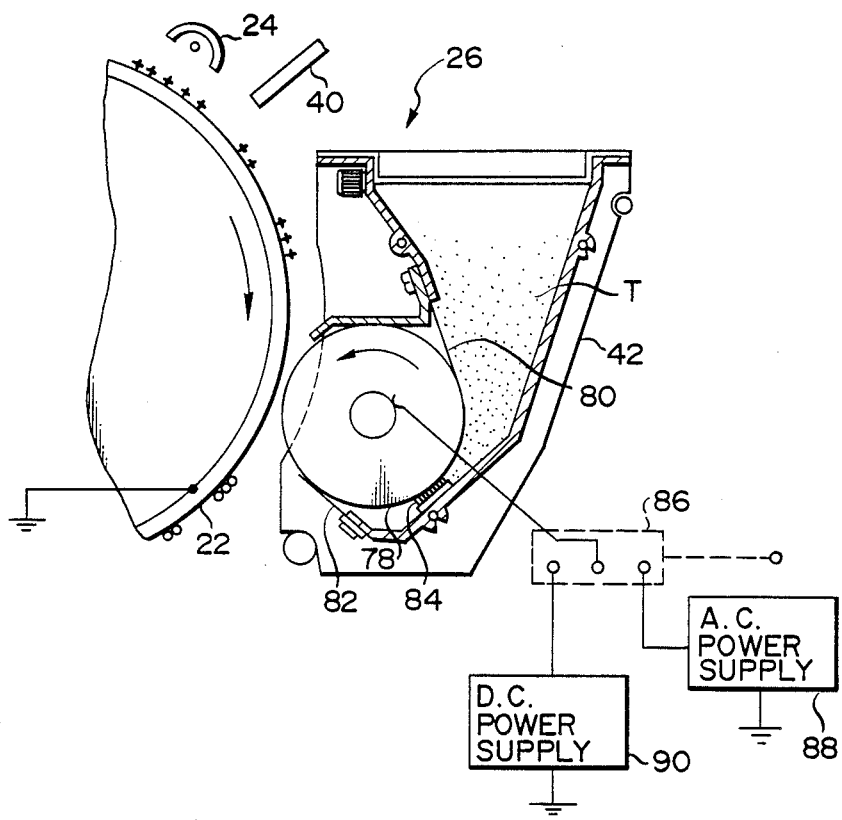

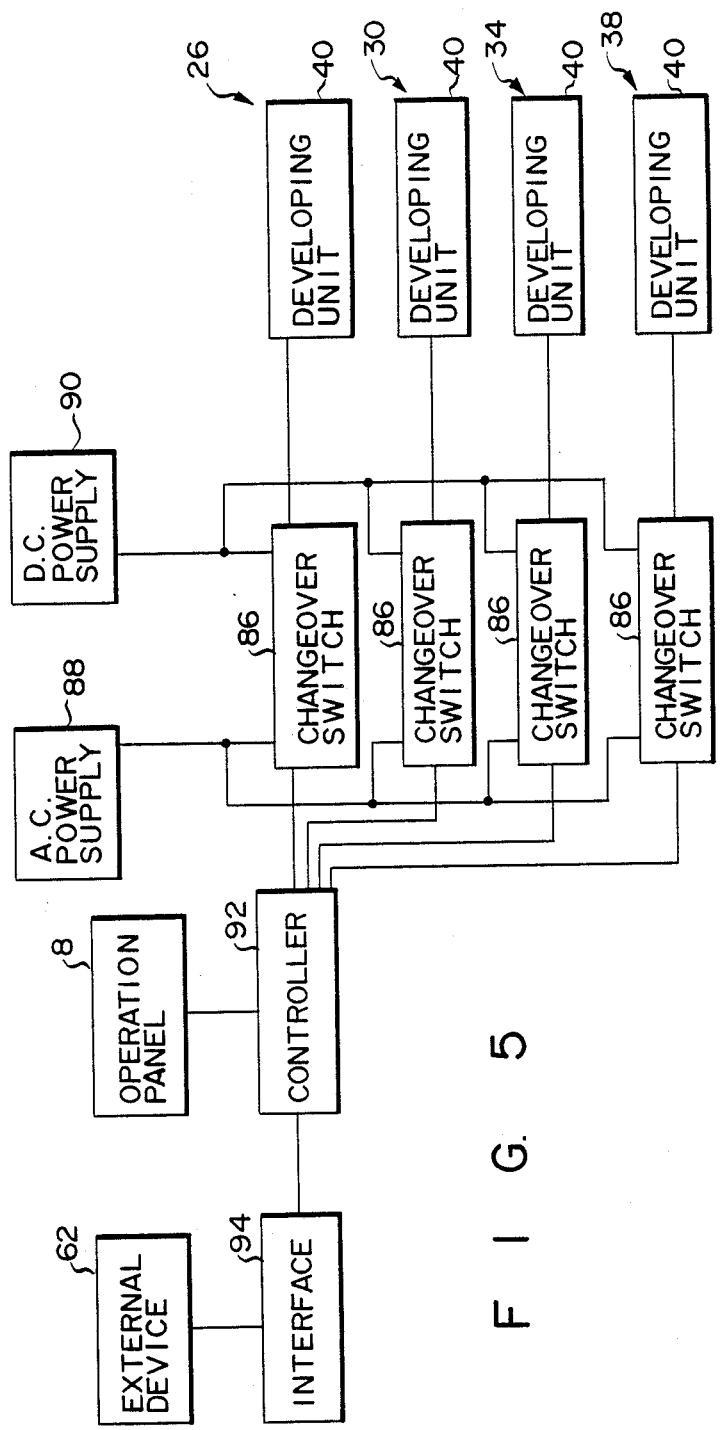
F I G. 5

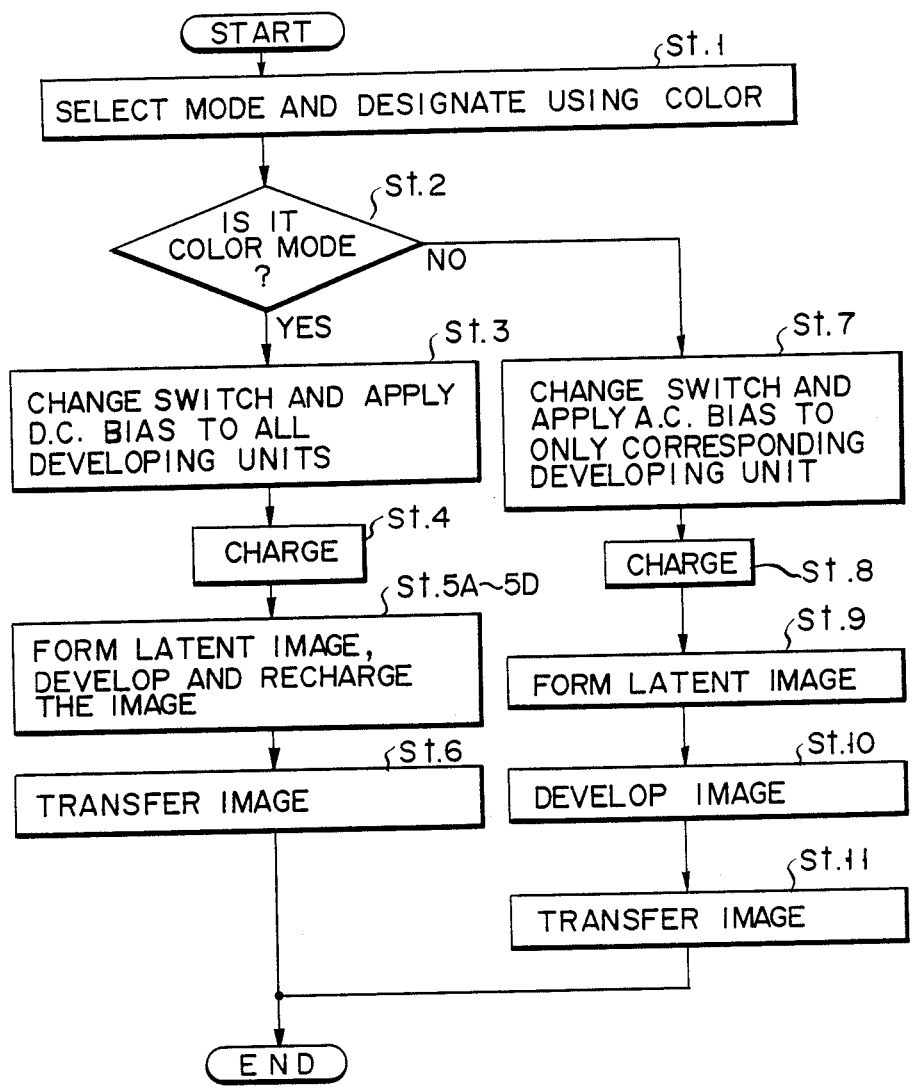
F I G. 6

RECORDING APPARATUS AND METHOD

BACKGROUND OF THE INVENTION

1. Field of the Invention

The present invention relates to a recording apparatus such as a color electrophotographic recorder and its recording method.

2. The Prior Art

Conventional recording apparatus of this type, color recorders such as "multiple-development and single-transfer type" and "multiple-development and multiple-transfer type" are known. In the multiple-development and single-transfer type, the electrostatic latent images formed sequentially on an image carrier, such as an electrophotographic photosensitive member, are developed by developers of different colors to form a multicolor toner image. Then, the images are simultaneously transferred to a record sheet. In the multiple-development and multiple-transfer type, electrostatic latent images are sequentially formed, developed and transferred to form a multicolor toner image on a recording sheet.

The multiple-development and single-transfer type is excellent in recording speed and superposing accuracy of the images, but has drawbacks such as a disorder of images and the mixing of different toner colors. There drawbacks occur because of the use of separate developing units when sequentially unfixed images are superposed on an electrostatic recording medium they can be easily disturbed. Because of these drawbacks this type of a recording apparatus has not yet been put to practical use.

There is proposed in Japanese Patent Application No. 233407/1982 a color recording apparatus which has a process for solving such drawbacks by preventing the same portions from being redeveloped. However, when this apparatus is used as a monochromatic recorder for a computer output unit, cannot improve the quality of images and recording speed as is needed.

It is known that the above-mentioned drawbacks are reduced but, not completely solved, by electrostatically preventing the mixing colors of toners.

It is also known that no mechanical contact between the toner and the image to be developed on the sheet can exist. Therefore, a flying developing method has been developed. This method can prevent mixing of colors and thus subsequent contamination and also can provide excellent gradation and color recording as compared with the conventional magnetic brush developing method. However, this method is apparently undesired for the purpose of copying a document full of characters. Consequently, a recording apparatus which can produce quality color and monochromatic images.

SUMMARY OF THE INVENTION

An object of the present invention is to provide recording apparatus and method capable of providing a preferable image in both color and monochromatic image recordings.

According to one aspect of the present invention, a recording apparatus records either a color image or monochromatic image. The user is able to select which type of image is to be recorded.

If a color image is to be recorded, a plurality of latent image forming and developing means are used to obtain a color developing agent image. Easch one of the plurality of latent image forming and developing means deposits a developing agent of a particular color on the carrier. The plurality of latent image forming and developing means works sequentially.

After the developing agent of the first latent image forming developing means is deposited on the carrier, the developing agent must not be displaced from its position on the carrier, otherwise, an improper mixing of different colors occurs. To prevent this a bias electric field between the carrier and the subsequent latent image forming and developing means is applied when a subsequent developing agent is applied to the carrier. Once all of the developing agents have been applied to the carrier, these developing agents are then simultaneously transferred to the recording member.

When a monochromatic image is recorded, only one of the plurality of latent image forming and detecting means is used. An electric field between the developing means and the carrier is applied to cause the developing agent to reciprocate between the developing means and the carrier, thereby causing a developing agent image on the carrier which will result in a recording member having a color of greater contrast.

In another embodiment, color developing using multiple latent image forming and detecting means is improved by recharging the areas of lower potential voltage which exist on the carrier due to the latent image formed by a previous latent image forming means. By recharging these areas, a uniform potential exists over the whole carrier. Therefore, when another latent image is formed, the reducing of potential across an area of already low potential does not occur. Therefore, the chance of different colors mixing is further reduced.

In this embodiment, numerous chargers can be located after each of said latent image forming and developing means and before the next latent image forming and developing means, thereby requiring the carrier to rotate only once per recording member made. However, one charger can be used, thereby requiring the carrier to rotate once for each different developing agent to applied to the carrier.

BRIEF DESCRIPTION OF THE DRAWINGS

FIG. 2 is a side view showing a light scanner of the apparatus of FIG. 1;

FIG. 3 is a perspective view of the light scanner;

FIG. 4 is a view for describing the construction of a developing unit of the apparatus in FIG. 1;

FIG. 5 is a view showing a circuit for applying a bias voltage of the apparatus in FIG. 1;

FIG. 6 is a flowchart showing the image forming sequence of the apparatus in FIG. 1;

DETAILED DESCRIPTION OF THE PREFERRED EMBODIMENTS

Figure 1:
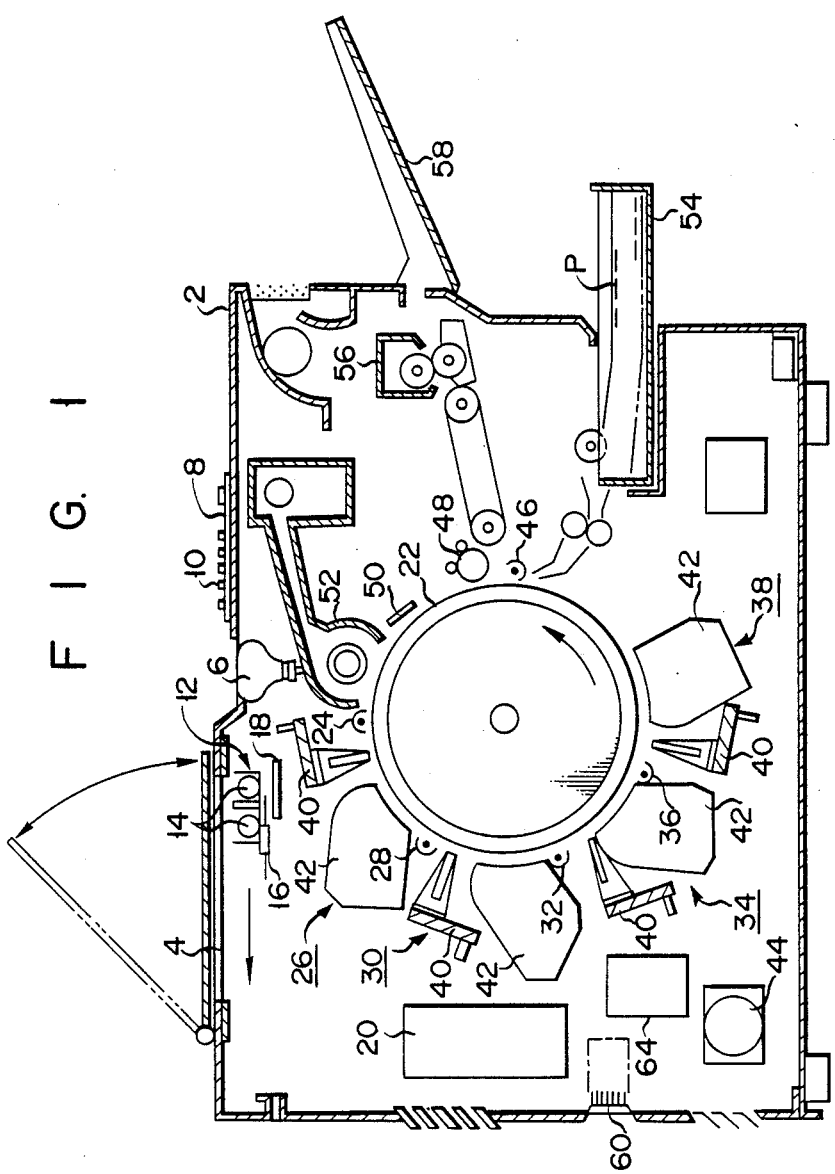
FIG. 1 is a schematic sectional view showing a first embodiment of a recording apparatus according to the present invention.

FIG. 1 shows a first embodiment of a recording apparatus according to the present invention. In FIG. 1, reference numeral 2 designates a housing. Original platform 4, indicator 6 and Operation panel 8 are provided on the upper surface of housing 2. An original is placed on platform 4. Indicator 6 indicates recording operation mode, for example, the number of copies. Panel 8 has selection keys 10 for selecting a color image recording mode or a monochromatic image recording mode, and selecting a color at monochromatic image recording mode time. Original reader 12 for reading an original image by scanning the original on platform 4 is provided under platform 4. More particularly, reader 12 illuminates the original placed on platform 4 by lamp 14, and its reflected light is transmitted through color separation filter 16 and received by a photoelectric transducer 18. Thus, image information is converted into an electric signal. The image information thus converted is supplied to memory information processor 20.

Photosensitive drum 22, which rotates in a predetermined direction, is supported substantially in the center of housing 2. Sequentially arranged along the rotating direction of drum 22 are charger 24, first latent image forming and developing unit 26, first recharger 28, second image forming and developing unit 30, second recharger 32, third latent image forming and developing unit 34, third recharger 36, fourth latent image forming and developing unit 28. Units 26, 30 and 34 respectively have light scanners 40 and developing units 42, Drum 22 is rotatably driven through a drive force transmission mechanism, not shown, by motor 44. In this embodiment, drum 22 is rotated by one revolution at one image recording time.

Further, transfer charger 46, separator 48, dielectric lamp 50 and cleaner 52 are sequentially arranged between unit 38 and charger 24. A toner image (developing agent image) on drum 22 is transferred by charger 46 to transfer sheet p (transferring medium) supplied from the sheet applying unit 54. Sheet p, thus transferred with the toner image, is separated from drum 22 by separator 48. The toner image transferred to sheet p is fixed by fixing unit 56. Sheet p, on which the toner image is fixed, is emitted by housing 2 to tray 58. After the toner image is transferred from drum 22 to sheet p, the surface of drum 22 is deenergized by lamp 50. After this deenergization, the toner remaining on drum 22 is cleaned by cleaner 52. After cleaning, drum 22 enters next cycle.

Input unit 60 is provided at the side of housing 2, and an image signal is inputted to unit 60 from external unit 62 (FIG. 5).

Scanners 42 of first to fourth units 26, 30, 34 and 38 scan with lights on the surface of drum 22 according to a signal fed through output circuit 64 from processor 20 or a signal fed through unit 60 from unit 62. As shown in FIGS. 2 and 3, scanner 40 has an array of light emitting elements (hereinafter referred to as "an LED array") 66 provided on the optical axis of convergent photoconductive members (Selfoc lens, trade name) 68. In LED array 66, light emitting diodes are arrayed per 1 mm. Array 66 is mounted on ceramic substrate 74 together with drive IC 70 and terminal pins 72. Members 68 are mounted through a pair of holders 76 (one of which is shown) on subtrate 74.

Unit 42 of first unit 26 is, for example, as shown in FIG. 4, a one-component noncontact developing unit. Unit 42 has conductive developing roller 78, toner coating blade 80, recovery blade 82 and temporary separating brush 84 of toner T. Roller 78 is rotated substantially at a speed equal the speed of drum 22 through a gap of 100 to 400 micron. Blade 80 is formed of phosphorus bronze or urethane rubber elastically contacted under pressure with roller 78, and a thin layer of high resistance-one-component nonmagnetic toner (having 11 micron of mean diameter) T is coated on roller 78. Developing units of second to fourth units 30, 34 and 38 have similar construction as unit 42 of first unit 26. Unit 42 of first unit 26 contains positively charged black toner, unit 42 of second unit 30 contains positively charged magenta toner, unit 42 of third unit 34 contains positively charged cyan toner, and unit 42 of fourth unit 38 contains positively charged yellow toner.

As shown in FIGS. 4 and 5, A.C. bias electric field from A.C. power supply 88 or D.C. bias electric field from D.C. power supply a 0 is applied through changeover switches 86 to between developing units 40 and drum 22. Switches 86 are driven by a signal supplied through controller 92 from panel 8 or a signal supplied from unit 62 through interface 94 and controller 92.

The image recording operation will now be described.

A color mode or a monochromatic mode is first selected and a color to be used at monochromatic mode time is selected by panel 8 or unit 62 in step 1. Then, the operation is advanced to step 2.

In step 2, whether is it color mode or monochromatic mode is judged. If judged as color mode, the operation advances to step 3. If judged as a monochromatic made, operation advances to step 7.

In step 3, the bias electric fields of all units 42 are switched by switch 86 to the D.C. bias electric field. Then, the operation advances to step 4.

In step 4, 5.6 kV of positive D.C. voltage is applied by charger 24 to set the surface potential of drum 22 to 1000 V ($V_1 = 1000$ V). Then, the operation advances to step 5A.

In step 5A, charged drum 22 is scanned by scanner 40 of first unit 26 in accordance with an image signal (black information) fed from reader 12 or unit 52. Thus, an electrostatic latent image according to black information is formed. Then, the latent image is developed by unit 42 of first unit 26. In other words, the image is developed by first color noncontact inverting development with positive black toner T. At this time, an output voltage (600 to 850 V) of D.C. power supply 90 is applied through switch 86 to roller 78 of unit 42. The operation goes to step 5B.

Then, in step 5B, a voltage having 4.0 kV of D.C. component and 5.0 kV of A.C. component is applied to first corotron type recharger 28, and the potential of first exposure unit (i.e., developing unit) is recharged to become substantially equal to the potential of unexposure portion. Then, recharged drum 22 is exposed and scanned by scanner 40 of unit 30 according to a red image signal. Thus, an electrostatic latent image according to red information is formed. Then, the latent image is developed by unit 42 of second unit 30. In other words, second color noncontact inverting development of positive red toner T is performed. The developing conditions at this time are entirely the Same as unit 42 of first unit 26.

In other words, a flying development mainly using D.C. bias electric field is achieved. In this case, since the flying property of toner T is different depending upon the difference of toner T, the voltage is suitably regulated. Thus, toner T is transferred in noncontact under D.C. bias electric field. Thus, first unfixed toner image formed already on drum 22 is not mechanically disordered. Since toner T is transferred in unidirectional electric field (i.e., D.C. bias electric field), the movement of toner T is unidirectional similarly to electrostatic force. Thus, since toner T on drum 22 is not reversely transferred to unit 42 of second unit 30, it can prevent different color toners from mixing. Since the first exposure unit is reset to the initial potential by recharging, the portion which is not subjected to the second exposure is not redeveloped. Accordingly, since it can simultaneously prevent the recording image from undesirably mixing in colors, conditions necessary in color copying process are all satisfied.

The developing bias may not always be complete D.C. bias electric field but may superpose A.C. bias electric field component thereon. This is because electrostatic vibration is acted on toner T on roller 78 to be activated to improve the developing sensitivity. However, if A.C. component increases to approx. 400 V or higher, an electric field for returning toner T reversely increases to cause toner already recorded on drum 22 is separated, thereby inducing image noise or mixture of colors. Thus, if the A.C. component is approx. 400 V or higher, it is not preferable to superpose the A.C. bias electric field on the D.C. electric field bias. Therefore, it is necessary to improve the developing property so as not to lose the unidirectivity of transfer of toner T when superposing the D.C. bias on the A.C. bias electric field. Thereafter, the operation advances to step 5C.

In step 5C, second recharger 32, and third unit 34 are similarly driven, thus achieving third color noncontact inverting developing by using positive upon toner T.

Then, in step 5D, third recharger 36 and unit 38 are sequentially driven under the same conditions, thereby performing fourth color noncontact inverting developing by using positive yellow toner T.

Thus, toner image of desired colors may be formed on drum 22. Then, the operation advances to step 6.

In step 6, the color toner image is applied with $-5.5$ kV of voltage by charger 46, and transferred to transfer sheet p fed from sheet supply unit 54. The transferred sheet p is separated from drum 22 by separator 48, fixed by fixing unit 56, and exhausted to tray 58.

In copying by color image recording process under the abovementioned conditions, unnecessary color mixture can be entirely eliminated to obtain a color print having excellent color reproducibility.

Figure 7:
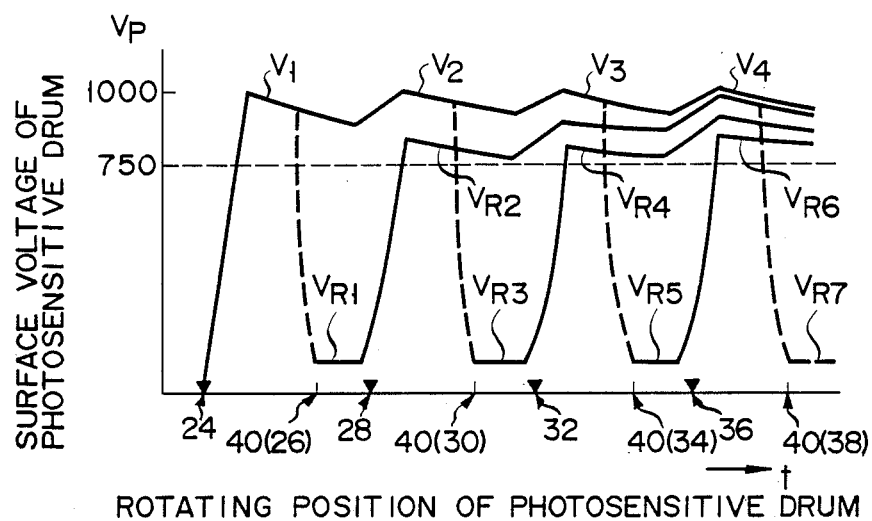
FIG. 7 is an explanatory view showing the state of the surface potential on a photosensitive member of the apparatus in FIG. 1.

FIG. 7 shows the relationship between the surface potential of drum 22 and rotating position of drum 22 at this time. Potentials $VR_1$, $VR_3$, $VR_5$ after exposed by scanner 40 are recharged by all 750 V or higher not developed by rechargers 28, 32 and 36, respectively. Further, drum 22 is recharged by rechargers 28, 32 and 36 in the attenuated amount due to natural discharge (dark attenuation) of drum 22 to maintain potentials $V_1$ to $V_3$ not exposed of drum 22 at set voltage of 1000 V.

Rechargers 28, 32 and 36 are not limited to corotron type, but may be scorotron type.

When the monochromatic mode is judged in step 2, the operation is advanced to step 7.

In step 7, the bias electric field of unit 42 of used color is switched by switch 86 to D.C. bias electric field. Then, the operation is advanced to step 8.

In step 8, when cyan (blue) is, for example, designated as a color to be used, only second recharger 32 is operated as a print is started, and drum 22 is charged to approx. 600 V. This charging potential was 1000 V in the previous color mode, but since the developing property is varied in this monochromatic mode, the charging voltage is regulatd. Then, advanced to step 9.

In step 9, a latent image is formed by scanner 40 of color to be used. Then, advanced to step 10.

In step 10, unit 42 of color to be used is operated. At this time, A.C. power supply 88 is connected through switch 86 to roller 78 of unit 42. In other words, an A.C. bias electric field in which D.C. voltage of 350 to 500 V, A.C. voltage having executing value of 300 to 800 V and frequency of 0.8 to 3 kHz are superposed is applied. Thus, a latent image formed by scanner 40 is inverted and developed by unit 42. In this case, toner T on roller 78 is repeated in vibration between roller 78 and drum 22 by A.C. bias electric field. Thus, since toner T is gradually attracted and converged to the latent image, the property that more toner T is adhered to the line or profile of the latent image is presented. Therefore, preferable image characteristic as office print or copy can be provided.

In this monochromatic mode, the charging, exposing and developing units are selectively operated similarly to the case of selecting other any color, and charging output is switched and distributed to similarly provide preferable monochromatic line copy.

Figure 8:
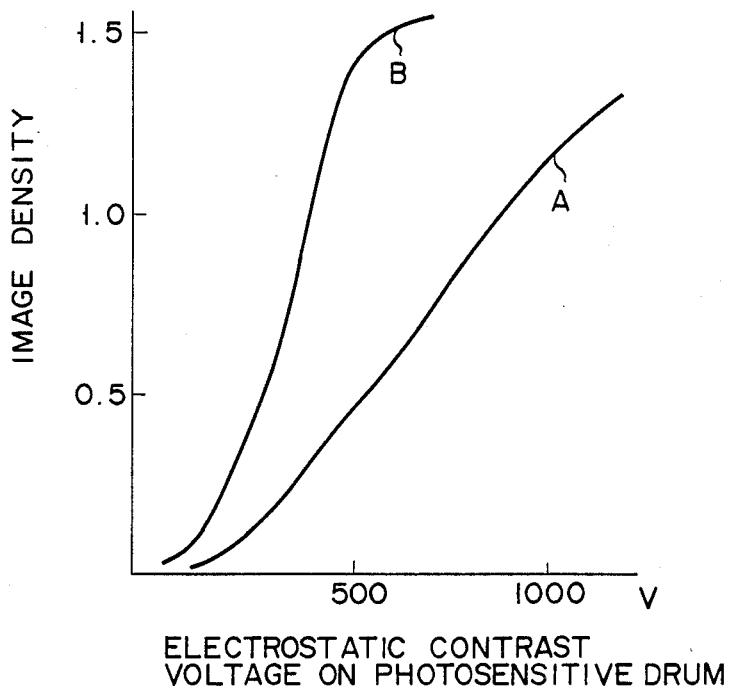
FIG. 8 is a view showing the relationship between the electrostatic contrast voltage on the photosensitive member and the image density of the apparatus in FIG. 1.

FIG. 8 shows the comparison of the case (A) that the relationship between electrostatic contrast voltage and image density on drum when developing with black toner under D.C. bias electric field with the case (B) that the same relationship when developing under A.C. bias electric field, with respect to the image property at line of 0.1 mm of width. From this comparison, the advantages of switching both modes are clarified.

Thus, desired monochromatic toner image is formed on drum 22. Then, the operation is advanced to step 11.

In step 11, the monochromatic toner image is transferred to sheet p fed from sheet supply unit 54 by applying $-5.5$ kV of voltage by transfer charger 46. The transferred sheet p is separated from drum 33 by separator 48, fixed by unit 56, and exhausted on dry 58.

As described above, the noncontact type developing unit is used as unit 42. D.C. bias electric field is applied substantially between unit 42 and drum 22 at color image recording time, and A.C. bias electric field is acted between unit 42 and drum 22 at monochromatic image recording time. Thus, toner T is flown and transferred. Thus, mixture of colors can be prevented at color image recording time, and a high contrast image can be provided at monochromatic image recording time. Accordingly, this recording apparatus can provide equivalent speed as a color copying machine and a color printed without decreasing the functions as a conventional office copying machine or printer for performing the monochromatic image recording.

In the embodiments described above, unit 42 employs noncontact type developing unit. However, since a toner image is not formed on drum 22 in the previous stage of unit 42 of first latent image forming and developing unit 26, a contact type developing unit may be used as unit 42 of first unit Further, rechargers 28, 32 and 36 may not always be necessarily provided.

In the embodiment described above, a D.C. voltage is applied to all developing units 42 when the color mode is selected. Nonetheless, the present invention is not limited to this. It suffices to apply the voltage to the second to fourth units 42.

Figure 9:
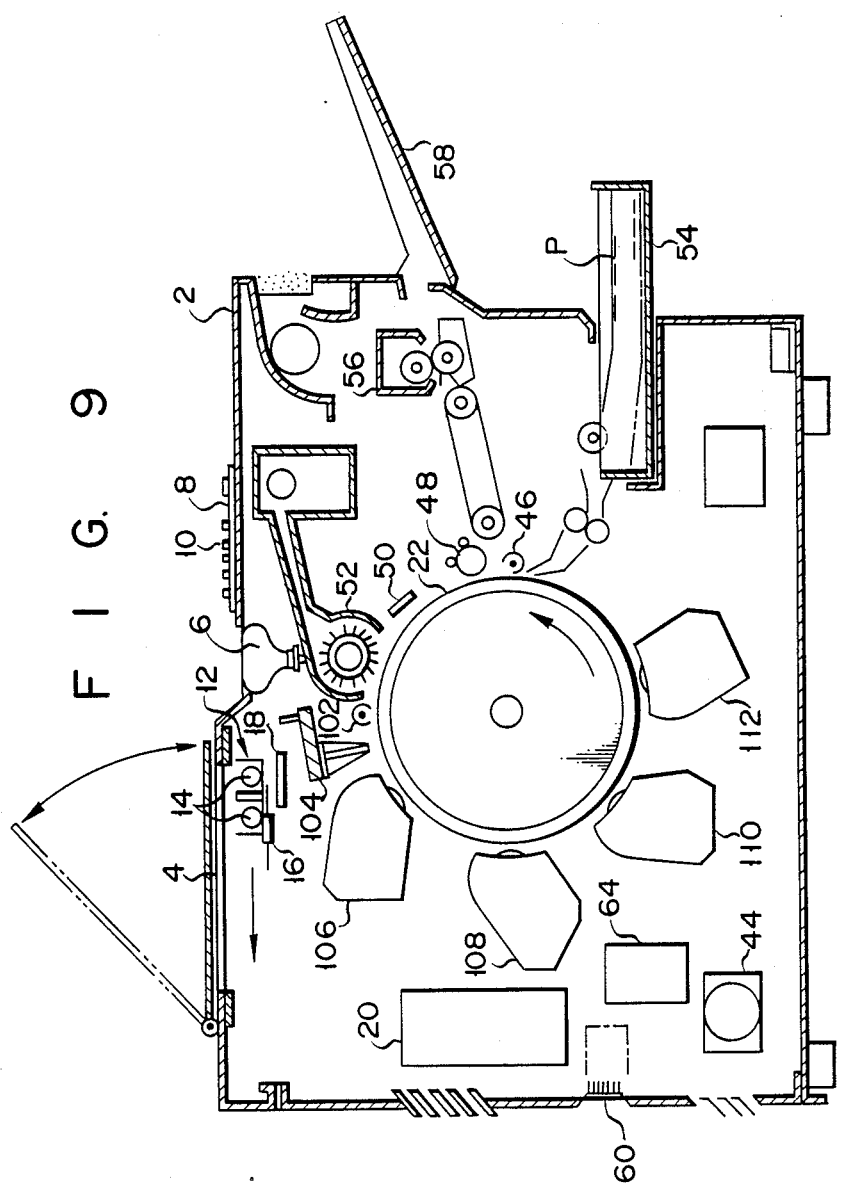
FIG. 9 is a schematic sectional view showing a second embodiment of a recording apparatus according to the present invention.

FIG. 9 shows a second embodiment of a recording apparatus according to the invention. In this second embodiment, recharger 102, light scanner 104, first developing unit 106, second developing unit 108, third developing unit 110 and fourth developing unit 112 are sequentially arranged along the rotating direction of drum 22 around drum 22. Drum 22 is rotatably driven through a drive force transmission mechanism, not shown, by motor 44. In this case, drum 22 is rotated by one revolution at first monochromatic image recording time, but rotated at plural revolutions (e.g., four revolutions) at first color image recording time.

Charging by charger 102, latent image formation by scanner 104 and development by first unit 106 are achieved by first rotation of drum 22 at color mode time. Then, charging by charger 102, latent image formation by scanner 104 and development by second unit 108 are performed by second revolution of drum 22. Similarly, charging, latent image formation and development of third and fourth revolutions are similarly carried out.

Charging by charger 102, latent image formation and development by developing unit of color to be used are achieved by one revolution of drum 22 at monochromatic mode time.

The other construction and operation are similar to those of first embodiment.

According to the construction described above, scanners and chargers may be reduced. Therefore, the recording apparatus can be simplified and reduced in cost.

What is claimed is:

1. A recording apparatus for recording a color image or a monochromatic image of a color selected from a plurality of colors on a recording member with a plurality of developing agents, comprising:
    selecting means for selecting color image recording mode or a monochromatic image recording mode and selecting the color at monochromatic image recording time;
    an image carrier;
    charging means for charging the carrier;
    a plurality of latent image forming and developing means provided along a moving direction of said carrier, said plurality composed of a first latent image forming and developing means and subsequent latent image forming and developing means, for using the developing agents of the plurality of colors, the latent image forming and developing means respectively having:
    latent image forming means for forming a latent image on the carrier charged by the charging means,
    developing means for developing the latent image formed by the latent image forming means with the developing agents,
    said plurality of latent image forming and developing means alternately repeat the formation of the latent image on the carrier charged by the charging means and the development of the latent image at color image recording mode time to form a color developing agent image;
    said latent image forming and developing means of the color selected by the selecting means forms the latent image on the carrier charged by the charging means, and develops the latent image at monochromatic image recording mode time to form a monochromatic developing agent image,
    said subsequent developing means developing the latent images without contact with the carrier,
    transfer means for transferring the color developing agent image or monochromatic developing agent image formed by the latent image forming and developing means on the recording member, and
    bias electric field applying means for applying a first bias electric field between the carrier and the subsequent developing means, said bias electric field applying means applying the bias electric field for moving the developing agent flown from the developing means by electrostatic force to move only in a direction toward the carrier at color image recording mode time and applying a second bias electric field having a sufficient intensity and frequency to cause the developing agent flown from the developing means to reciprocate at monochromatic image recording mode time.

2. The recording apparatus according to claim 1, wherein the developing means of said subsequent latent image forming and developing means has a noncontact developing unit using one-component developing agent.

3. The recording apparatus according to claim 2, wherein the noncontact developing unit performs an inverting development.

4. The recording apparatus according to claim 1, wherein the recording apparatus further comprises a plurality of recharging means, the recharging means recharging the image carrier prior to the image formation by subsequent latent image forming and developing means at color image recording time.

5. The recording apparatus according to claim 4, wherein the recharging means recharges the image carrier by applying a D.C. corona voltage to the carrier.

6. The recording apparatus according to claim 4, wherein the recharging means recharges the image carrier to a level for eliminating the potential difference generated by the formation of the latent image by the previous latent image forming and developing means to a level so that the electrostatic latent image formed by the previous latent image forming and developing means will not be redeveloped by next latent image forming and developing means.

7. The recording apparatus according to claim 1, wherein the developing means of said subsequent latent image forming and developing means develops the latent image without contact with developing agent adhered already to the image carrier.

8. The recording apparatus according to claim 1, wherein the image carrier has a photosensitive drum rotating in a predetermined direction.

9. The recording apparatus according to claim 8, wherein the latent image forming means and developing means are disposed along the rotating direction of said photosensitive drum.

10. A recording apparatus for recording a color image or a monochromatic image of a color selected from a plurality of colors on a recording member with a plurality of developing agents, comprising:
    selecting means for selecting color image recording mode time or a monochromatic image recording mode and selecting the color at monochromatic image recording time, an image carrier, drive means for rotating the carrier by plural rotations at color image recording mode time and by one revolution at monochromatic image recording mode time, charging means for charging the carrier rotated by the drive means before a first rotation of the plural rotations at color image recording mode time and before the one revolution at monochromatic image recording mode time, latent image forming means for forming a latent image at every one revolution of the carrier on the carrier charged by the charging means, developing means for developing the latent image formed by the latent image forming means to obtain a color developing agent image, said developing means having a plurality of developing units provided in the rotating direction of the carrier including a first developing unit and subsequent development units for developing the latent image with the plurality of developing agents so that each of the plurality of developing units sequentially develop the latent image formed during each revolution on the carrier by the latent image forming means at color image recording mode time to form said color developing agent image, said subsequent developing units developing the latent images in noncontact on the carrier, the developing means also allowing the developing unit for developing with the developer corresponding to the color selected by the selecting means to develop the latent image formed by the latent image forming means at monochromatic image recording mode time to form a monochromatic developing agent image, transfer means for transferring the color developing agent image and monochromatic developing agent image formed by the developing means on the recording member, and bias electric field applying means for applying:

a first bias electric field between the carrier and the subsequent developing means, said bias electric field applying means applying the bias electric field for moving the developing agent flown from the developing means by electrostatic force to move only in a direction toward the carrier at color image recording mode time;

a second bias electric field having a sufficient intensity and frequency to cause the developing agent flown from the developing means to reciprocate at monochromatic image recording mode time.

11. A recording method comprising the steps of selecting either a color image recording mode or a monochromatic image recording mode;

if said color image recording mode is selected, further including the following steps of:

charging the carrier;

forming and developing a complete latent image, said step including the step of:

using one of a plurality of latent image forming and developing means to form a first latent image on the carrier and then developing said first latent image with a first developing agent, applying a bias electric field across a subsequent latent image forming and developing means and the carrier, using said subsequent latent image forming and developing means to form a subsequent latent image on the carrier and developing said subsequent latent image with a subsequent developing agent, repeating the previous two steps until all of said plurality of latent imaging forming and detecting means have deposited a developing agent on the carrier to form a developer image, transferring the developer image to a recording member;

if said monochromatic image recording mode is selected, including the following steps of:

selecting a color to be recorded;

charging the carrier, selecting one of said plurality of latent image forming and developing means to form a latent image on the carrier and developing said latent image with said developing agent to obtain a monochromatic developer image;

transferring said monochromatic developer image to a recording member.

12. The recording method according to claim 11, wherein the forming and developing step of color image recording mode further includes the step of recharging the image carrier prior to the formation of a subsequent latent image.

13. A recording apparatus for recording a color image or a monochromatic image of a color selected from a plurality of colors on a recording member with a plurality of developing agents, comprising:

means for selecting color image recording or monochromatic image recording and if said monochromatic image recording is selected, further selecting the color of the monochromatic image to be recorded;

an image carrier;

means for charging the carrier;

a plurality of latent imaging forming and developing means each holding one of said plurality of developing agents for forming a developed agent image on said carrier with said developing agent;

means for applying a bias electric field between the carrier and each of said plurality of latent image forming and developing means, said bias electric field means including:

means for applying a first bias electric field to all subsequent, but not a first, of said plurality of latent image forming and developing means to cause said developing agents already applied to said carrier to stay on said carrier, when said color image recording is selected, and means for applying a second bias electric field to said latent image forming and developing means associated with said selected color to cause said developing agent associated with said selected latent image forming and developing means to reciprocate between said carrier and said selected latent image forming and developing means when said monochromatic image recording is selected; and means for transferring said developed agent image to said recording member.

14. The recording apparatus according to claim 13 wherein when said color image recording is selected, a recharging means recharges the image carrier prior to the usage of said subsequent latent image forming and developing means.

15. The recording apparatus according to claim 13 wherein said subsequent latent image forming and developing means develops latent image without contact with said developing agent adhered already to said image carrier.

16. The recording apparatus according to claim 13 wherein the image carrier is charged to a higher potential when said color image recording is selected then when said monochromatic image recording is selected.

* * * * *